Nov. 5, 1935.   O. J. SEGUIN   2,019,799
SINK DRAIN APPARATUS
Filed April 25, 1935
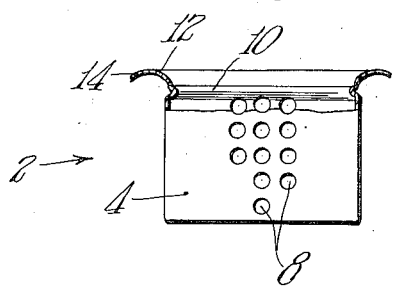
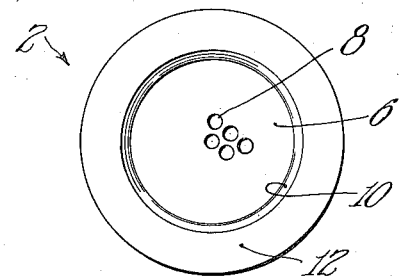
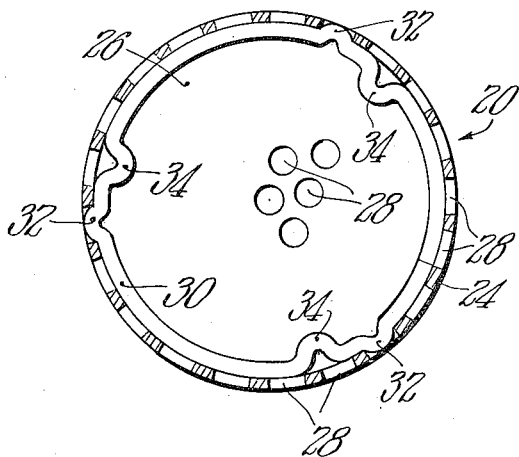
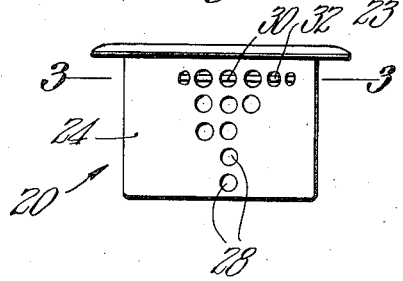
INVENTOR.
Oscar J. Seguin.
BY
ATTORNEY.

Patented Nov. 5, 1935

2,019,799

UNITED STATES PATENT OFFICE 2,019,799

SINK DRAIN APPARATUS

Oscar J. Seguin, Springfield, Mass.

Application April 25, 1935, Serial No. 18,170

3 Claims. (Cl. 4—291)

This invention relates to improvements in sink-drain apparatus and is directed more particularly to an improved strainer for use in a drain plug of usual construction.

The principal objects of the invention are directed to the provision of a novel strainer which is so arranged and constructed that the strainer may be suitably supported for its straining function and is at the same time readily and easily removable from the plug. Not only is my new strainer so formed that it may be conveniently and efficiently associated with a drain plug in such a way that immediate drainage is readily permitted but the strainer is simple in form and formed of but few parts so as to be economical to manufacture.

As a special feature of the invention, the strainer has means associated therewith whereby one may easily remove it from the plug without inconvenience. This means is of such a nature that it does not materially raise the cost of production of the strainer.

Various other novel features and advantages of the invention will be more fully hereinafter referred to in connection with the accompanying description of the preferred form of the invention and reference will be had to the accompanying drawing wherein:

Fig. 1 is an elevational view partly in section of the strainer of the invention;

Fig. 2 is a plan view of the strainer shown in Fig. 1;

Fig. 3 is an enlarged sectional plan view through a strainer similar to that shown in Fig. 1, with a modified form of the invention associated therewith taken on the line 3—3 of Fig. 4; and Fig. 4 is a side elevational view of a strainer similar to that shown in Fig. 1 with a modified form of the invention associated therewith.

Referring now to the drawing more in detail, the invention will be fully described.

In Fig. 1 there is shown a cup-shaped strainer 2 which is preferably circular in form and has a vertical continuous side wall 4 and a bottom wall 6. The strainer is preferably formed of a single piece of metal and it is provided with a plurality of apertures 8 which may extend through either the side wall 4 or bottom wall 6, or both.

A peripheral flange 12 is provided at the upper side of the strainer and this may be formed by curving the upper marginal edge portion of the side wall 4 upwardly and outwardly and then downwardly, as shown, so that an outer downwardly-sloping marginal edge portion 14 is provided. It will thus be seen that the strainer 2 may be supported in a drain plug of common construction with the portion 14 of the strainer resting on the usual flange of the plug.

Adjacent the upper side of the strainer there is provided an inner peripheral bead 10 which projects inwardly beyond the plane of the inside of the wall 4 and which may be formed by a spinning operation or the like. This bead 10 preferably is continuous and extends circumferentially of the inner side of the strainer between the flange 12 and the upper edge of the side wall 4.

It will be readily seen that the strainer may be readily lifted from the drain plug by engaging the bead 10. Not only may such a bead be economically provided but it may be easily formed on the strainer.

According to the modified form of the invention, a lifting member 30 is provided which is similar to the bead 10 shown in Fig. 1. The lifting member 30, however, is formed of a piece of wire or similar material which is associated with a strainer 20 in such a way that it projects inwardly beyond the plane of the inner circumference of the strainer.

The strainer 20 is similar to that shown in Figs. 1 and 2 and has a side wall 24 and bottom wall 26 with apertures 28 provided therein similar to the openings 8. A flange 23 similar to the flange 12 is provided at the upper side of the wall 24.

According to the preferred form of the invention, the length of wire 30 is bent intermediate its ends to have spaced outwardly-extending nibs 32 which are adapted to be received in certain apertures 28 and inwardly-projecting portions 34 which are adapted to be engaged between the fingers to lift the strainer upwardly and out of the drain plug.

It will be seen that with the portions 32 engaged in the apertures, the wire 30 is firmly associated with the strainer 20. Preferably these portions 32 are received in apertures 28 which are located at the upper side of the strainer adjacent the flange 23 thereof.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A sink strainer having a cylindrical side wall provided with circumferentially spaced apertures in combination with a lifting device comprising, a length of wire formed to fit within and lie against said side wall which is provided with spaced outwardly extending projections receivable in certain of said apertures whereby it is secured to said strainer and inwardly extending spaced projections serving as finger grips to facilitate lifting of the strainer.

2. As a new article of manufacture, a lifting device for a sink strainer having a cylindrical shaped side wall provided with spaced circumferentially disposed apertures comprising, a length of wire formed in the shape of a circle to fit within and lie against the side wall of the strainer which is offset outwardly at spaced points to provide spaced projections on its outer side which are insertable in certain of the apertures of the strainer wall whereby the lifting device may be assembled with a strainer.

3. As a new article of manufacture, a lifting device for a sink strainer having a plurality of circumferentially spaced apertures in the side wall thereof comprising, a length of wire formed to fit within and lie against the inside of the side wall of the strainer having spaced outwardly extending spaced portions receivable in certain apertures of the strainer whereby it is secured to the strainer and provided with spaced inwardly extending finger engaging portions to facilitate lifting the strainer when secured thereto.

OSCAR J. SEGUIN.